No. 722,371. PATENTED MAR. 10, 1903.
W. LINHOFF.
HEDGE TRIMMER.
APPLICATION FILED MAY 26, 1902.
NO MODEL. 3 SHEETS—SHEET 1.
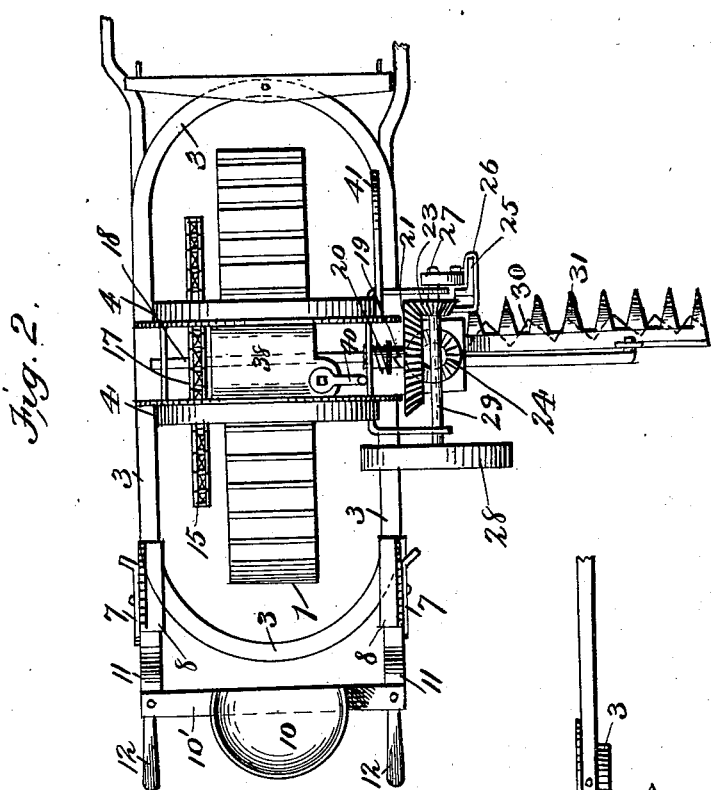
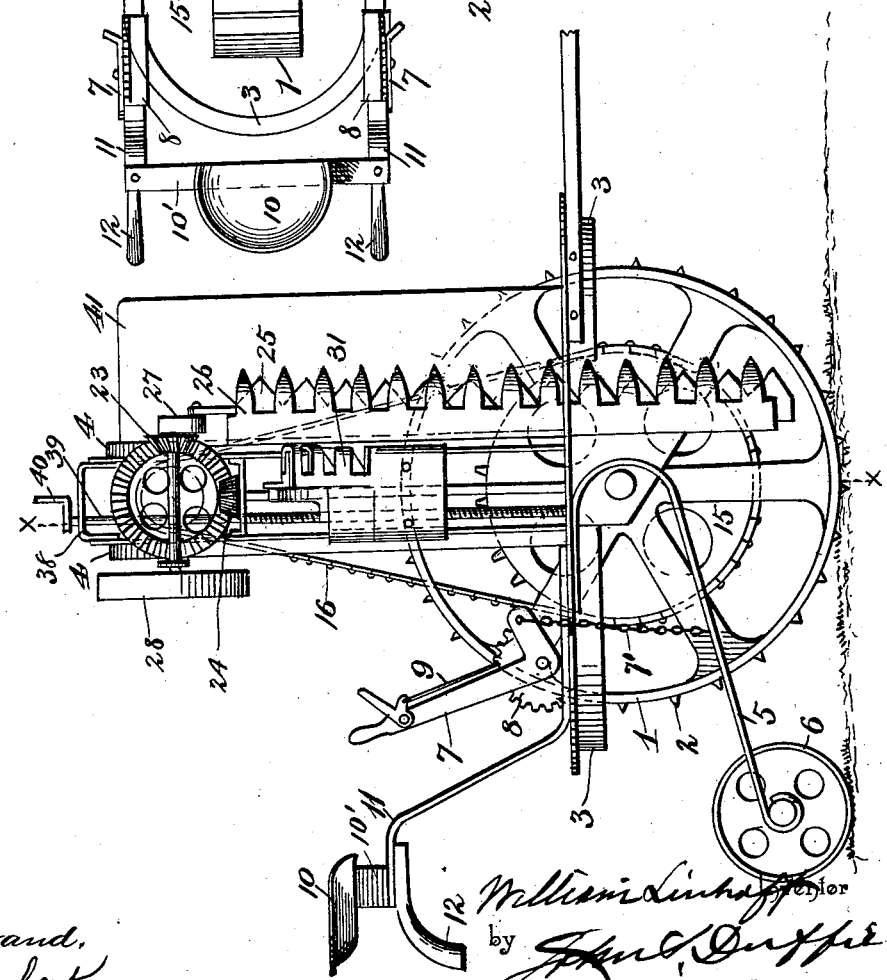
Witnesses
F. L. Ourand.
J. E. Lambert.
William Linhoff, Inventor
by
Attorney No. 722,371. PATENTED MAR. 10, 1903.
W. LINHOFF.
HEDGE TRIMMER.
APPLICATION FILED MAY 26, 1902.
NO MODEL. 3 SHEETS—SHEET 2.
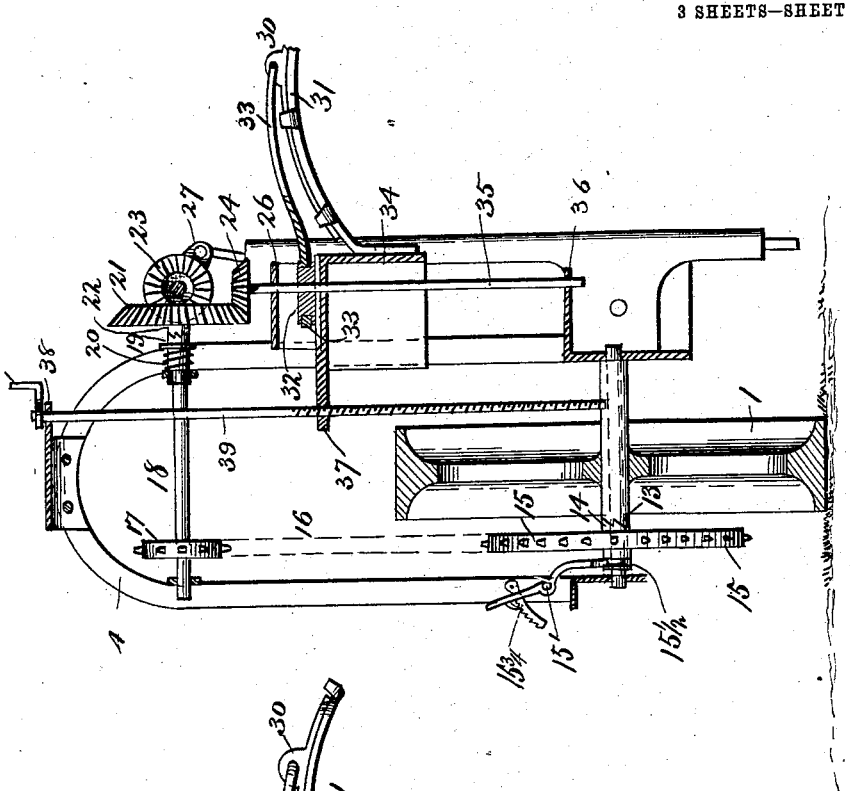
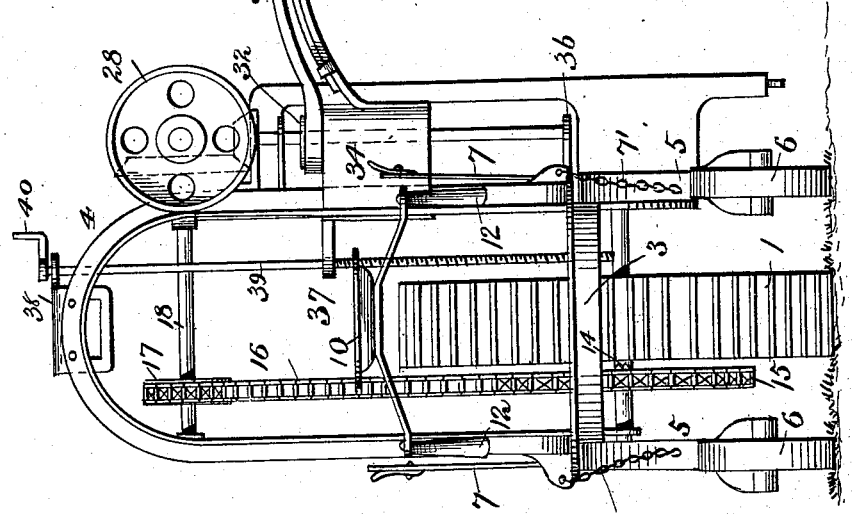
Witnesses
F. L. Ourand.
J. E. Lambert.
William Linhoff, Inventor
by John J. Duffie
Attorney

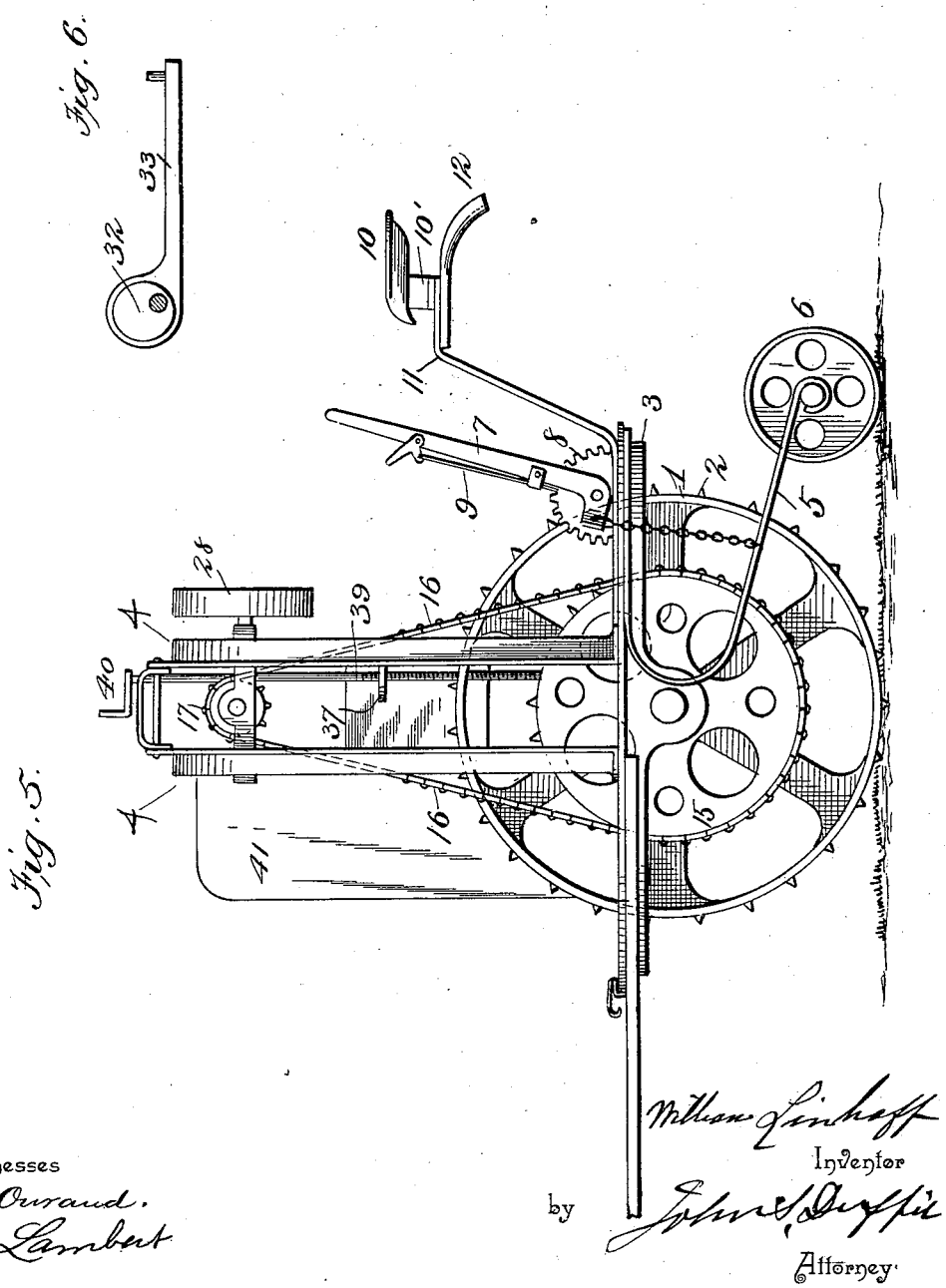

UNITED STATES PATENT OFFICE.

WILLIAM LINHOFF, OF NEBRASKA CITY, NEBRASKA.

HEDGE-TRIMMER.

SPECIFICATION forming part of Letters Patent No. 722,371, dated March 10, 1903.

Application filed May 26, 1902. Serial No. 109,076. (No model.)

*To all whom it may concern:*

Be it known that I, WILLIAM LINHOFF, a citizen of the United States, residing at Nebraska City, in the county of Otoe and State of Nebraska, have invented certain new and useful Improvements in Hedge-Trimmers; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention is a machine for trimming hedges, and is intended to keep any kind of a hedge trimmed to the shape desired by the operator. It is especially adapted to trimming the Osage-orange hedge, but may be used to trim hedges made from other growths.

This invention has two cutting-bars, with sickles similar to a grass-mower. One is a straight bar set in a vertical position to trim the sides of the hedge. The other is curved and set horizontal or at a right angle to the vertical bar and is designed to trim the top of the hedge.

This machine may be operated by one horse and one driver.

In the accompanying drawings, Figure 1 is a side elevation of my invention. Fig. 2 is a top plan view with the shafts broken away. Fig. 3 is a rear elevation. Fig. 4 is a cross-vertical sectional view of Fig. 1, line X X, looking from the rear of the machine. Fig. 5 is a side elevation of my invention. Fig. 6 is a detailed view showing the top end of an eccentric-pinion and an arm operated thereby.

My invention is described as follows: The drive-wheel 1 is quite heavy, wide-faced, and provided with sharp long projections 2 to cut well into the ground, so as to overcome all danger of slipping. The frame 3, inside of which the drive-wheel 1 works, has a double arch consisting of two U-shaped bows 4 4, which carries the gear mechanism. Underneath the frame 3 at its rear end are two spring-beams 5, curved somewhat like a horseshoe-magnet. The upper halves of these springs are bolted to the frame. Their lower halves are bifurcated, and journaled in said bifurcations are small supporting-wheels 6. These supporting-wheels 6 prevent the machine from toppling or falling over and by means of the self-acting spring-beams 5 adapt themselves to rough or uneven ground. These supporting-wheels 6 are also adjustable to sloping or sliding ground by adjusting-levers 7 by means of chains 7', secured to said spring-beams and said levers. Said levers are mounted on ratchet-bearings 8, secured to the frame, and are adapted to be locked by hand-operated lock-bars 9. The seat 10 is secured to a cross-bar 10', and said cross-bar is secured to two spring-arms 11, extending out from the rear of the frame 3. The rear ends of these spring-arms 11 terminate in handles 12, which are to be used when the operator walks instead of rides. By the proper use of these adjusting-levers 7 and the self-acting spring-beams 5 and wheels 6 the machine can be easily kept in a perpendicular position, no matter how rough or sloping the ground.

Motion is given to the cutting mechanism by the ratchet-clutch hub 13 of the drive-wheel 1 operating a similar clutch-hub 14 of sprocket-wheel 15, which operates sprocket-chain 16, which chain works sprocket-pinion 17 on shaft 18 in top of the arch 4 4. The lever 15' is secured to one of the bows of the frame, and its lower end works in a groove 15½ in the outer end of the ratchet-hub 14, by which the lever of said sprocket-hub 14 may be thrown out of contact with the sprocket-hub 13 and may be held out of such contact by means of a lock-bar 15¾. On the outer end of this shaft 18 is secured a ratchet-hub 19, actuated by a spring 20, and still farther out on the end of said shaft 18 is journaled a bevel gear-wheel 21, provided with a hub 22, meshing with said ratchet-hub 19, which ratchet-hub and spring permits said bevel gear-wheel 21, with its attachments, full play when the machine slacks its motion or comes to a full stop, thus preventing the mechanism from being sprung or broken. The said bevel gear-wheel works two bevel-pinions 23 and 24. 23 operates the sickle 25 in the upright bar 26 by a common crank-pitman connection 27, and bevel-gear 24 operates the sickle 30. A fly-wheel 28 is mounted on the rear end of the shaft 29 of the bevel cog-wheel 23, which may also be provided with a spring ratchet-hub device, as above described, but it is hardly deemed necessary. Bevel gear-wheel 24 operates a curved sickle 30 in curved bar 31 by an eccentric pinion connection 32 and arm 33. This curved bar 31 is secured to an adjustable seat 34, and a rod 35 has its upper end secured to the bevel cog-wheel 24 and passes down through a bearing and said adjustable seat 34 and has its lower end journaled in a bearing 36, and working around the said rod 35 is the eccentric connection 32 and the arm 33, which operates the cutting-sickle 30. (See Fig. 6.) The part of said rod which works through the adjustable seat 34 is flat, and thus has the power of rotating the eccentric 32.

Extending inwardly from the adjustable seat 34 is an arm 37, which is provided with a threaded perforation, and extending through said threaded perforation and upwardly through a bearing 38, secured to the top of the arch 4 4, is a threaded rod 39, and secured to the top of said threaded rod 39 is a crank-handle 40. Said threaded adjusting-rod 39 being thus connected with the adjustable seat 34, I am enabled by means of the crank-handle 40 to raise or lower the curved bar 31 by rotating said rod 39, and thus cut off the hedge to any height desired.

Extending forward from the arch 4 4 and immediately to the left of the perpendicular bar 26 is a fender 41. This fender 41 prevents all cut off twigs and the like from getting into the mechanism of the machine.

The exterior bevel-gear mechanism is also closed up by a snug-fitting cover, which, however, is not shown in the drawings, as it is not claimed as invention, and as I could not well show it without cutting off the views of the frame-trimming sickles and the mechanism necessary to operate them.

No machine of this kind can do entirely satisfactory work when it has a two-wheel drive-carriage with the frame between the wheels, as the ground near the hedge is always more or less rough, uneven, or sloping.

Having described my invention, what I claim as new, and desire to secure by Letters Patent, is—

1. The combination of the frame 3; the double arch 4 4, secured to and rising vertically from said frame; a drive-wheel 1, provided with sharp projections 2, journaled in said frame; a ratchet-hub 13, extending from one side of said drive-wheel; a sprocket-wheel 15, journaled in said frame, concentric with said drive-wheel; a ratchet-hub 14, extending from one side of said sprocket-wheel, and contacting with ratchet-hub 13; a lever 15', pivoted to the arch 4 4, and adapted to throw the said ratchet-hub 14, out of contact with ratchet-hub 13; a shaft 18, journaled in the upper part of the double arch 4 4; sprocket-wheel 17, secured on said shaft, immediately over sprocket-wheel 15; sprocket-chain 16, working over said sprocket-wheels; a spring-actuated ratchet-hub 19, mounted on one end of the shaft 18; a bevel cog-wheel 21, mounted on the outer end of said last-mentioned shaft 18, and having a ratchet-hub 22, adapted to contact with ratchet-hub 19; a shaft journaled in bearings, extending from the arch 4 4; a bevel gear-wheel 23, secured near one end of said shaft, and meshing with bevel gear-wheel 21; a fly-wheel 28, secured on the opposite end of said last-mentioned shaft; an upright bar or sickle-guard 26, secured vertically to the said frame, and said arch, and carrying a sickle-blade 25; a crank 27, secured to the last-mentioned shaft, and operating said sickle-blade; an adjustable seat 34, adjustably secured to the arch 4 4; a curved bar 31, secured to said seat, and extending horizontally therefrom; a shaft, its upper end journaled in a bearing, secured to the arch 4 4, and its lower end in a bearing, secured to the frame; a bevel gear-wheel, secured to the upper end of said shaft, and meshing with bevel gear-wheel 23; a sickle-blade 30, working in the bar 31, an eccentric 32, and arm 33 actuating said sickle-blade 30; an arm 37, secured to, and extending inwardly from the seat 34, and provided with a vertical perforation; a threaded rod, working in the last-mentioned perforation, and journaled vertically in said arch 4 4, and adapted to be rotated, and thus move the said seat 34, bar 31, and sickle-blade 30, up and down; spring-arms 5, secured to the lower side of the frame, and bearing in their bifurcated ends, wheels 6; ratchet-bearings 8, mounted on the upper side of said frame; adjusting-levers 7, pivoted to said ratchet-bearings, and adapted to be locked by lock-bars 9; chains 7', one end secured to the said levers, and the other to said spring-arms; a fender 41, extending from the forward side of the arch 4 4; spring-arms 11, extending from the rear end of the frame, their ends terminating in handles 12, and a seat 10, secured on the free ends of said arms; said machine adapted to be drawn by one horse, substantially as shown and described and for the purposes set forth.

2. The combination of the frame; the double arch rising vertically therefrom; a drive-wheel journaled in said frame, and provided with a ratchet-hub; a sprocket-wheel also journaled in said frame, concentric with said drive-wheel, and provided with a ratchet-hub, adapted to contact with the ratchet-hub of the drive-wheel, and adapted to be thrown out of contact therewith; a shaft journaled in the upper part of the arch; a sprocket-wheel secured to said shaft, immediately over said sprocket-wheel; a sprocket-chain working around said wheels; a bevel gear-wheel pivoted on the outer end of the said last-mentioned shaft; a shaft journaled opposite the face of the said bevel gear-wheel, and carrying a bevel gear-wheel, meshing with said first-mentioned gear-wheel, and carrying on its end, a fly-wheel; a sickle-guard secured vertically to said frame; a sickle-blade working in said guard, an eccentric-crank and pitman-arm, secured to the last-mentioned shaft operating said sickle-blade; a seat adjustably secured to the arch; a curved sickle-guard horizontally secured to said seat; a sickle in said guard; an eccentric and arm operating said sickle-blade; a bevel gear-wheel meshing with the first-mentioned gear-wheel, a shaft, actuating said eccentric; an arm extending from said seat, having a threaded perforation; a threaded rod working in said perforation, journaled to said arch, and adapted to raise or lower said seat; spring-arms extending from the rear of said frame, and carrying a seat; curved arms extending rearwardly from the lower face of said frame, and carrying in their ends, wheels; levers and chains adapted to adjust said arms, substantially as shown and described and for the purposes set forth.

In testimony whereof I affix my signature in presence of two witnesses.

WILLIAM LINHOFF.

Witnesses:
CHARLES E. SHRADER,
GEO. W. MCCALLUM.